Dec. 10, 1968     R. S. GUTOW, JR     3,416,073
PRECISION MAGNETIC FIELD INTENSITY SCANNER AND
MASS SPECTROMETER USING SAME
Filed Feb. 18, 1966     3 Sheets-Sheet 1

INVENTOR.
RUSSELL S. GUTOW JR.
BY
ATTORNEY

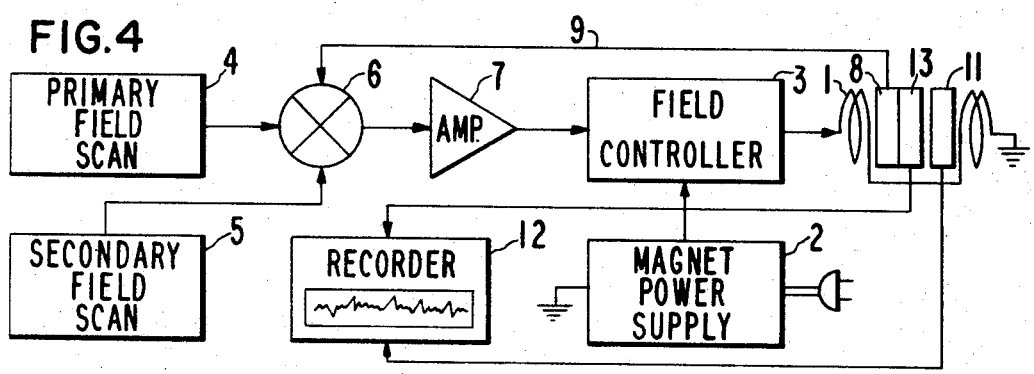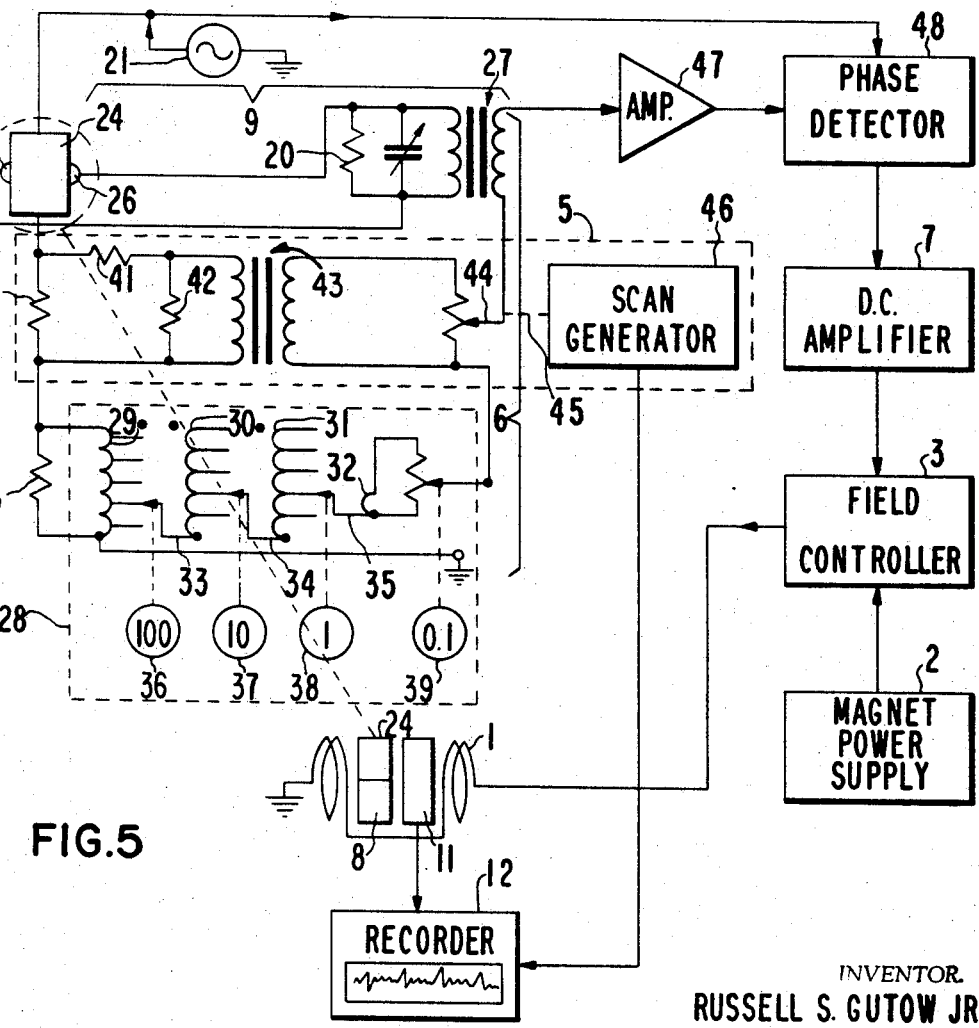

United States Patent Office 3,416,073
Patented Dec. 10, 1968

3,416,073
PRECISION MAGNETIC FIELD INTENSITY SCANNER AND MASS SPECTROMETER USING SAME
Russell S. Gutow, Jr., Mountain View, Calif., assignor to Varian Associates, Palo Alto, Calif., a corporation of California
Filed Feb. 18, 1966, Ser. No. 528,650
3 Claims. (Cl. 324—45)

ABSTRACT OF THE DISCLOSURE

A precision magnetic field intensity scanner and mass spectrometers using same are disclosed. The magnetic field intensity scanner includes a source of A.C. potential which is connected across the input terminals of a decade transformer. The decade transformer serves as a precision potential divider network to derive a multitude of discrete incremental voltages which may be selected according to the settings of the decade transformer, such selected output voltage having a precisely predetermined linearity and serving as a primary scan reference signal. A Hall effect transducer is disposed in the magnetic field to be scanned to derive a signal having an amplitude serving as a measure of the magnetic field intensity. An error detector compares the amplitude of the primary scan reference signal with the amplitude of the signal derived from the Hall effect transducer to obtain an error signal corresponding to the difference in the amplitude of the two signals. The error signal is fed to a magnetic field controller for causing the intensity of the magnetic field to track the amplitude of the primary scan reference signal to produce a null balance condition in the output of the error detector, whereby the magnetic field intensity is caused to be scanned in accordance with the selected settings of the decade transformer. When the scanned magnetic field is the ion focusing field of a mass spectrometer, the Hall effect transducer preferably comprises a tandem connection of two such transducers to derive a magnetic field measuring signal for comparison in the error detector that varies linearly according to the second power of the magnetic field, whereby the scanned output of the mass spectrometer is linear with respect to charge-to-mass ratio.

---

Figure 1:
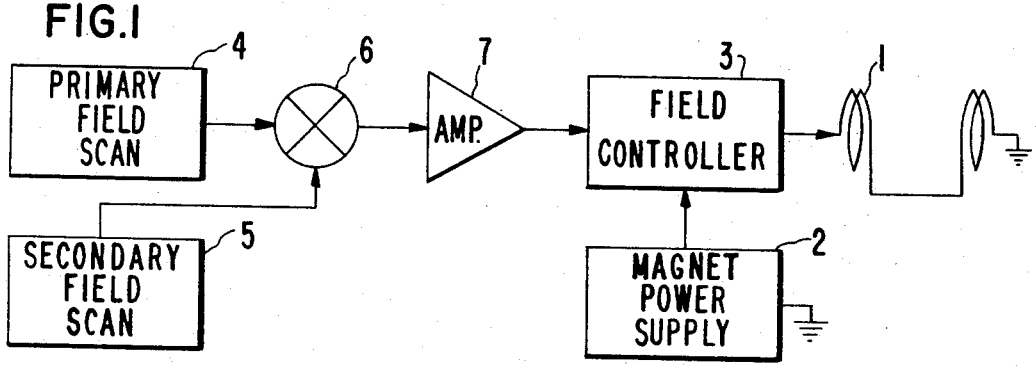

Heretofore magnetic field scanners have been built which employed an adjustable potentiometer for deriving an adjustable reference output for determining the primary scan of the magnetic field (a variable selectable field value about which or from which a lesser or secondary scan is obtained). This primary reference output, typically a reference voltage, was selectable to any value within a wide range of values by a front panel dial adjustment, mechanically interconnected to the reference potentiometer. It has been found, however, that even the most precise potentiometers are lacking in the requisite linearity over wide dynamic ranges and thus the primary field value, selected by the calibrated scale of the front panel adjustment, often departs substantially from the actual field condition obtained therefrom. These departures from linearity complicate calibration of the spectra obtained from devices employing the scanned field such as cycloidal mass spectrometers and nuclear resonance spectrometers. Such a prior art magnetic field scanner is disclosed in U.S. Patent 3,267,368, issued Aug. 16, 1966, and assigned to the same assignee as the present invention.

In the present invention the primary reference output, which determines the nominal field values, from which value the field is subsequently scanned, is obtained from an adjustable precision transformer whereby the linearity of the primary magnetic field scan is substantially improved as compared to scans previously derived from precision potentiometers. In a further embodiment of the present invention, the lesser or secondary scan output, which determines the scanned field values departing from the nominal field value determined by the first transformer, is derived from a second adjustable transformer whereby linearity of the secondary field scan is further improved.

The principal object of the present invention is the provision of a magnetic field scanner having improved linearity and to provide such improved scanner in combination with mass spectrometers whereby calibration and interpretation of their output mass spectra are facilitated.

One feature of the present invention is the provision of an adjustable inductive means for deriving an adjustable output which is linear over a wide dynamic range and which output is used in a magnetic scan system to obtain a magnetic scan having improved linearity.

Another feature of the present invention is the same as the preceding wherein the output of the inductive means is obtained in discrete incremental values having a precisely predetermined linearity over a substantial dynamic range of variation in output.

Another feature of the present invention is the same as any one or more of the preceding features wherein the variable output inductive means is employed in a closed loop field scan system to derive discrete values of magnetic field according to its selected output.

Another feature of the present invention is the same as any one or more of the preceding including a second adjustable inductive means to derive a second scan output for varying the magnetic field in smaller increments about the field value determined by the first inductive means.

Another feature of the present invention is the same as any one or more of the preceding including in combination a cycloidal mass spectrometer means having its magnetic focusing field intensity squared scanned by the aforesaid magnetic field scanner in a linear manner whereby calibration and interpretation of the spectrometer's output spectra are facilitated.

Figure 2:
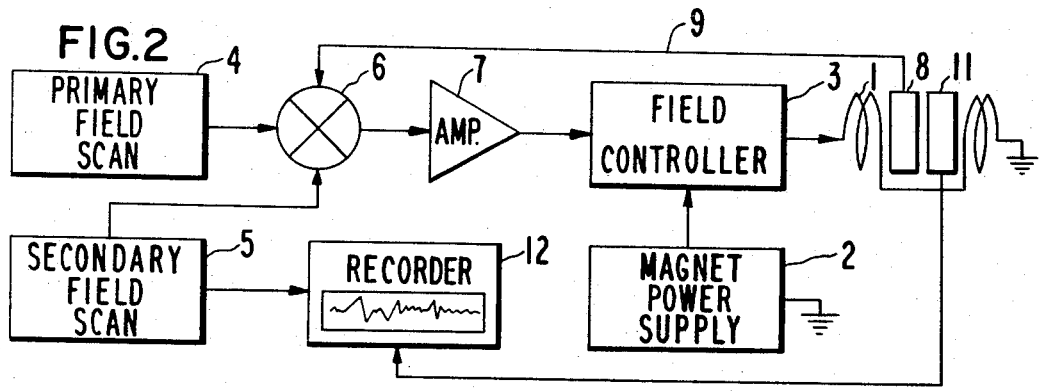
Figure 3:
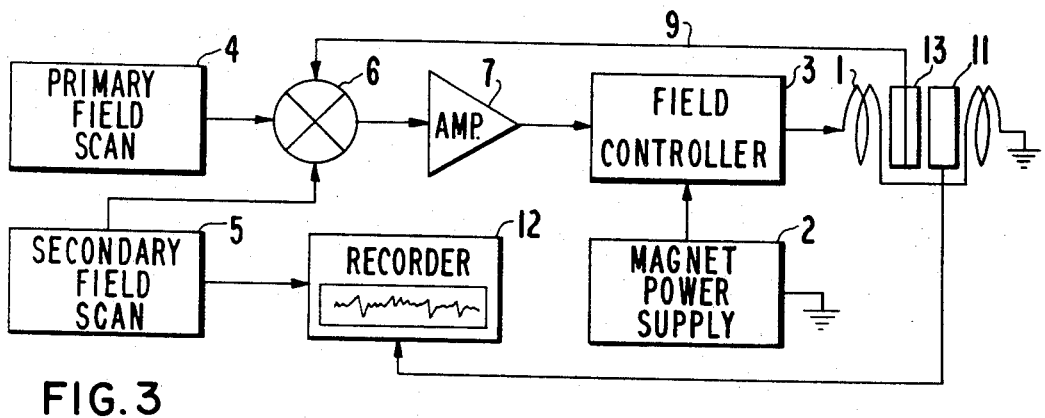
Figure 6:
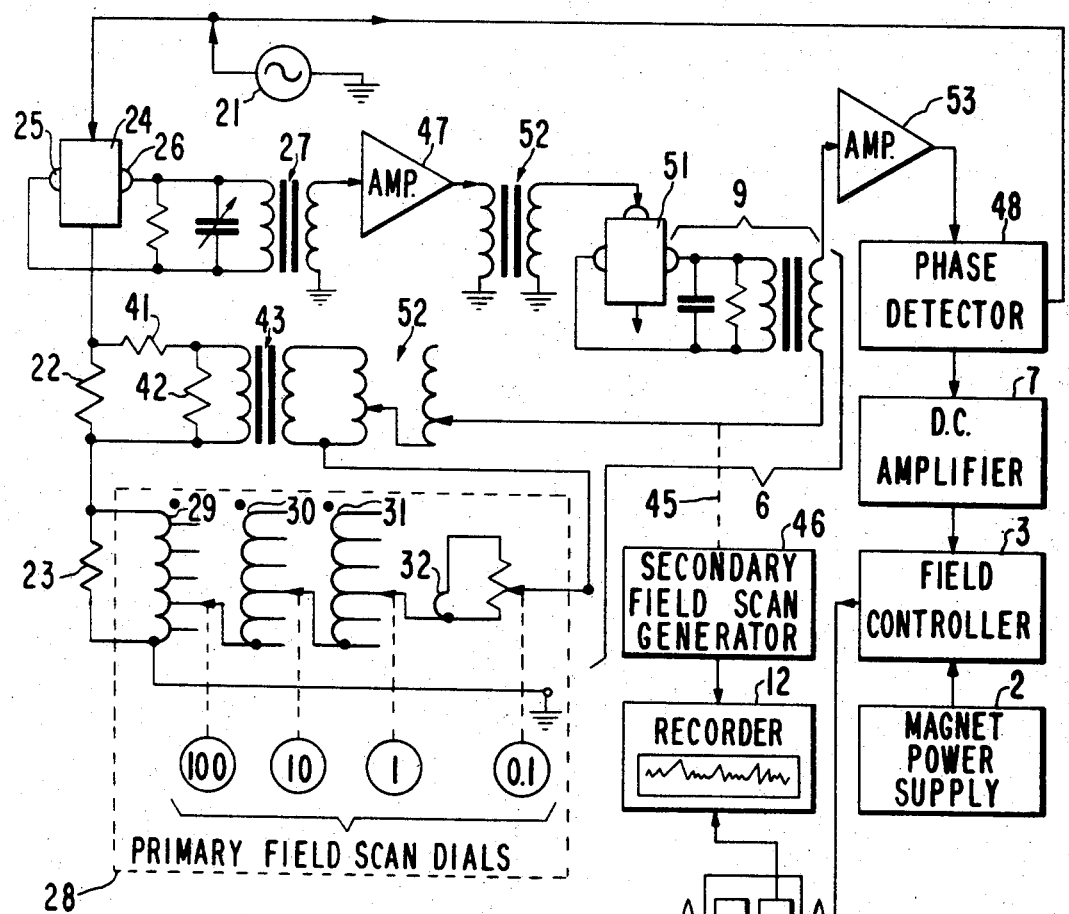
Figure 7:
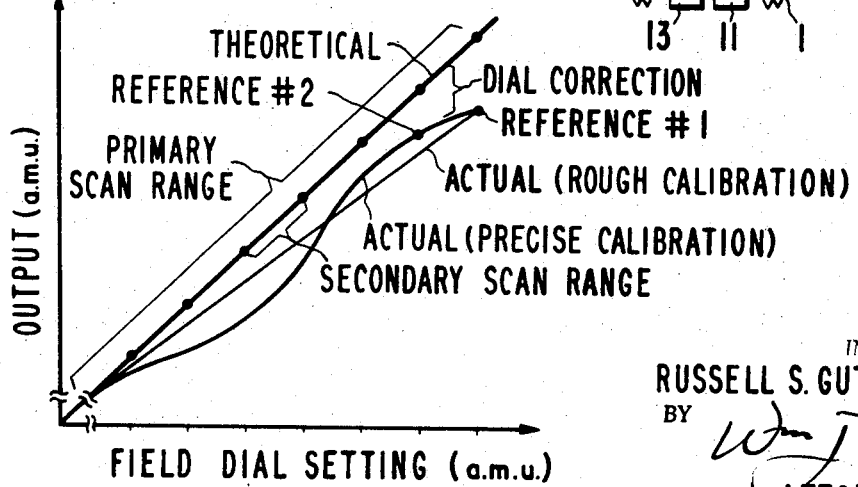

Other features and advantages of the present invention will become apparent upon a perusal of the following specification taken in connection with the accompanying drawings wherein:

FIG. 1 is a schematic block circuit diagram of a magnetic field scanner employing features of the present invention, FIG. 2 is a schematic diagram of a closed loop alternative to the circuit of FIG. 1 and embodying features of the present invention, FIGS. 3 and 4 are schematic diagrams of alternative closed loop circuits embodying features of the present invention, FIG. 5 is a circuit diagram, partly in block diagram form, of the circuit of FIG. 2, FIG. 6 is a circuit diagram, partly in block diagram form, of the circuit of FIG. 3, and FIG. 7 is a plot of output atomic mass units as selected atomic mass units for a combined mass spectrometer and field scanner showing the spectra calibration method.

Referring now to FIG. 1, there is shown an open loop system for scanning a magnetic field produced by an electromagnet 1. Briefly, the system includes a magnet power supply 2 supplying current to the magnet 1 via series field controller 3 controlling the series current from the power supply 2 to the magnet 1.

A primary field scan 4 supplies a first reference output which is preferably provided in a linear distribution of discrete predetermined incremental values corresponding to certain preselected magnetic field values corresponding to a linear distribution covering a wide range of field values. A secondary field scan 5 supplies a secondary variable reference output, which may be continuous or discrete, and when added to the primary output corresponds to a linear distribution of outputs corresponding to a range of output values disposed intermediate the discrete primary output values.

The primary field scan output is algebraically added to the secondary field scan output in an error detector 6 to produce a scan or error output $\epsilon$ amplified in amplifier 7 and fed to the input of the field controller 3 for causing the magnetic field to take a value determined by the error output $\epsilon$.

In the field scanner system of FIG. 1 the linearity of the actual field scan obtained depends upon the linearity of the magnet 1, field controller 3, amplifier 7, and the primary field scan output. For wide dynamic scan ranges the magnet 1 and field controller 3 represent the limiting factors. Thus the improved field scan apparatus of the present invention would not, in most instances found in practice, be called for in an open loop system of the type shown in FIG. 1. However, if in such a system the linearity of the output of the primary field scan 4 became significant, the improved adjustable inductive means, to be fully described below, would be useful for deriving the adjustable linear scan output.

Referring now to FIG. 2, there is shown a closed loop magnetic field scan system. In the system and throughout the remainder of this description, the same numerals will be used to identify like elements in the various figures. This system is similar to that of FIG. 1 except that a field measuring device 8, such as a Hall-effect semiconductor, is located in the field being scanned for deriving an output proportional to the magnetic field intensity H. This output is fed back via feedback loop 9 to the error detector 6 in such a manner as to buck out the sum of the outputs of the primary and secondary field scans 4 and 5, respectively.

Any unbalance in the output of the error detector 6 gives rise to an error signal $\epsilon$ which causes the field controller 3 to produce a field in the magnet sufficient to balance the servo loop into a condition as dictated by the combined outputs of the primary and secondary scans 4 and 5.

The closed loop system of FIG. 2 has much greater linearity than that of FIG. 1 because the closed loop feature has eliminated the non-linearity of the magnet 1, field controller 3, magnet power supply 2 and amplifier 7. The limiting factors are now the linearity of the field scan outputs, particularly that of the primary field scan 4, and the linearity of the field measuring device 8. With proper compensation, the field measuring device can be made to have a high degree of linearity.

Thus, the ultimate system performance depends heavily upon the linearity of the primary field scan output which can be made quite linear by use of a variable inductance in the manner as more fully described below with regard to FIGS. 4 and 5.

The magnetic field scan system is typically used with a field utilization device 11 such as a spectrometer which has an output dependent upon the magnetic field. Such spectrometers include gyromagnetic resonance spectrometers and mass spectrometers. The output of the field utilization device is typically recorded in a recorder 12 as a function of time or as a function of the field scan output derived from the secondary field scan 5.

Referring now to FIG. 3, there is shown another closed loop magnetic scan system wherein the magnetic field intensity squared is scanned to a high degree of linearity. In this case the magnetic field measuring device is a second power transducer 13 which provides a linear output proportional to the square of the magnetic field intensity in which it is immersed. Such a transducer is formed by a pair of Hall-effect crystals with the output of the first applied as a current input to the second. The output of the second crystal is linear with the magnetic field intensity squared.

The second power field scan system of a FIG. 3 is especially useful in combination with field utilization devices 11 having an output to be recorded which is proportional to the second power of the magnetic field. Examples of such field utilization devices include cycloidal type mass spectrometers as described in U.S. Patent 2,221,467 issued Nov. 12, 1940, and single focusing magnetic deflection mass spectrometers. Such linear second power scans permit the output of mass spectrometers to be linear in terms of mass units of the substances under analysis, thereby greatly facilitating calibration, analysis and interpretation of the recorded output spectra.

Referring now to FIG. 4, there is shown an alternative magnetic field scan system to that of FIG. 3 for obtaining linear recordings of outputs, from field utilization devices 11, which vary in proportion to the second power of the magnetic field. The system employs the first power field scan system of FIG. 2 with a second power transducer, which may use the output of its first power transducing stage as the output of the first power field measuring device 8.

The output of the second power transducer 13 is fed to the recorder 12 as its scan input such that the second power field dependent output of the field utilization device 11 is recorded as a function of the second power output of the magnetic field transducer, thereby obtaining a recording linear in output units of the field utilization device 11, such as for example, a cycloidal mass spectrometer.

Referring now to FIG. 5, there is shown in more detail the circuit of FIG. 2. A constant current audio frequency generator 21 supplies current at a frequency of 1290 Hz. to a series connection of voltage dividing resistors 22 and 23 and a Hall-effect semiconductor crystal 24. The output voltage of the Hall crystal 24, obtained across terminals 25 and 26, is proportional to the magnetic field intensity H in which the crystal 24 is immersed. The location of the Hall crystal is indicated by the dotted circle and lead line to the magnet 1. There the Hall output serves as a measure of the magnetic field intensity.

The Hall output is fed to a series circuit branch, forming the error detector 6, via isolation transformer 27. The transformer 27 has a tuned primary to present a high impedance to the Hall crystal 24 and includes a shunting compensating resistor 20.

The primary scan reference output voltage is derived across precision low temperature coefficient 10 p.p.m. series resistor 23 as of 10Ω and fed into an adjustable output inductive voltage divider device 28 such as a decade transformer model DT–47 made by Electro Scientific Industries of Portland, Oregon. The decade transformer 28 has an extremely high input inductance as of 100–300 henries at 1290 Hz. and includes four sets of precision-wound tapped windings 29, 30, 31 and 32 wound on a toroid core.

The first set of windings includes 9 series-connected end-tapped coil segments. Each coil segment includes $n$ turns, where $n$ is, for example, 100. The second set of windings 30 includes 11 series-connected end-tapped coil segments of $n/10$ turns each. The third set of windings 31 includes 9 series-connected end-tapped coil segments of $n/100$ turns each. The fourth set of windings 32 is only one coil segment of $n/100$ turns, which is connected across a potentiometer such that the pickoff may pick off any desired voltage appearing across the last winding 32.

The taps on the various windings are brought out to the contacts of three rotary switches 33, 34 and 35 which are each controlled from a separate dial 36, 37 and 38 mounted on the front panel of the primary field scan 4.

The various windings are connected to the rotary switches such that for the zero dial settings of all the dials the switches all interconnect to the adjacent windings at the same ends such that no voltage is tapped off of any of the windings. Intermediate switch settings have the voltage tapped off of each winding added in series to the voltage tapped off the adjacent winding. Due to the factor of ten in difference between the number of turns of the coil segments in adjacent windings, the same factor of ten in tapped off output voltage is obtained. One feature of this transformer of importance is that the second decade winding 30 includes 11 tapped coil segments and this permits overlap in the precise voltage division between the second and first decade without having all windings of the first decade wound to the precision of the second decade. Thus only decimal fraction from 0.1% to 100% of the total possible output voltage, as determined by the series resistor 23, may be selected by the dials 36, 37, 38 and 39, the latter dial controlling the potentiometer setting across the output of the last winding 32. This variable selected output, which is obtained in discrete incremental values of high precision, is applied in series opposition with the Hall voltage in the error detector branch 6 for determining the variably selectable discrete magnetic field intensity values falling within the primary scan range corresponding to the setting of the dials. In this example the dials 36–39 may be calibrated directly in gauss and when used with a powerful electromagnet may be used to select any field value in units of 10 gauss from 10 gauss to 10,000 gauss.

The linearity of the outputs of the various windings for a typical decade transformer are ±10 parts per million (p.p.m.) between positions on the first winding 29 and ±2 p.p.m. between positions on the windings 30 and 31. Thus, the linearity of the primary field scan output is as good as ±20 p.p.m. over a 1% dynamic range and ±2 p.p.m. over 0.1% of its dynamic range.

The secondary scan output is derived across resistor 22 and further divided by resistors 41 and 42 and the fractional output derived across resistor 42 is applied into the series error detector branch 6 via an isolation transformer 43 feeding a variable potentiometer 44 in series with error branch 6. The seconday scan output as picked off by potentiometer 44 is variably controlled as by a rotary shaft 45 connected to the output of the secondary scan generator 46. The secondary scan 5 sweeps the magnetic field over the ranges between adjacent primary scan values.

The output of the error detector branch 6 is applied to the input of a high input impedance operational amplifier 47, such as a Philbrick amplifier. The output of the amplifier is fed to one input terminal of a phase sensitive detector 48 wherein it is compared with the phase of a signal derived from the audio generator 21 to produce an output D.C. signal which is fed to amplifier 7 and the remaining part of the system is as previously described above with regard to FIG. 2.

Referring now to FIG. 6, there is shown a more detailed circuit diagram for the second power field scan system of FIG. 3. This circuit is similar to that of FIG. 5 except that the output of the first Hall crystal 24 is fed via isolation transformer into an operational amplifier 47 for converting the first Hall voltage into a current proportional to the Hall voltage. The output of the amplifier 47 is fed into the current input of a second Hall crystal 51 via transformer 52. The output voltage of the second Hall crystal, which is proportional to the second power of the magnetic field intensity in which it is immersed, is fed into the series error branch 6 in opposition to the primary scan output derived from the variable output inductive device 28.

The secondary scan output may be derived in the same manner as described with regard to FIG. 5 or, alternatively, as shown in FIG. 6, a more precisely adjustable inductive device may be employed. In this case the secondary scan voltage derived across series resistor 22 and as divided further by resistors 41 and 42 is fed into the input of a two-stage decade transformer 52 of a type similar to element 28 previously described with regard to FIG. 5. The output of the transformer is applied in series with the error branch 6 such as to add to the output of the primary field scan for scanning between primary field values. The rotary switch of the secondary scan decade transformer 52 is conveniently driven in discrete rotary steps from a stepping motor in the secondary field scan generator 46. The same stepping motor may conveniently be used to drive the scan of the recorder 12 whereby a linear readout of mass units of a cycloidal mass spectrometer field utilization device 11 is obtained on the recorder.

The output of the error detector branch 6 is fed to the input of an amplifier 53 which has its output applied to the phase detector 48 to cause the second power of the magnetic field to track the linear scan output of the primary and secondary field scanners 4 and 5 respectively in the manner as previously described with regard to FIG. 3.

The systems of FIGS. 3 and 6 is especially useful for recording the mass spectrum of a cycloidal mass spectrometer or other type of magnetic mass spectrometer having a mass output signal linear in mass units as a function of the second power of the magnetic field. More particularly, the extreme linearity, especially of the primary field scan, greatly facilitates calibration and analysis of output mass spectra. For example, the front panel dial settings of the primary field scan may be calibrated directly in units of atomic mass. The linearity of the system is such that these dial settings will be accurate to 0.2%. Greater accuracy is obtained by mass calibration of the dials.

Calibration is easily explained by reference to FIG. 7 where output atomic mass units of the spectrometer 11 is plotted as a function of dial settings for a certain portion of the total dynamic scan range. As seen, the theoretical curve of output versus input readings is linear. A first, one point type of rough calibration is obtained by dialing in a certain known mass of a reference substance which reference mass is near the range over which the operator wants calibration. The reference substance is then introduced and its mass recorded as reference point #1. Any displacement in atomic mass units of the spectrum line from the dialed value for this substance is the correction in mass units to be added to or subtracted from mass units read for unknown substance lines under analysis. This first calibration method assumes the actual system performance is linear but only displaced up or down from the theoretical value.

A second more precise method of system calibration uses two known reference mass substances having mass spectrum lines near to and preferably straddling the mass range to be calibrated. The actual departure from the theoretical dial settings for these two reference substances, reference #1 and #2 assuming the actual system is linear between calibration points, allows the correction to be obtained by simple interpolation for unknown mass peaks within the calibrated range.

Using the inductive voltage divider 28 or decade transformer of the present invention calibrated system, linearity can be as good as one part per million giving mass measurement accuracy to better than 1 millimass mass unit over wide system dynamic ranges of 10 to 2000 atomic mass units.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for scanning the intensity of the magnetic field, means forming a source of A.C. potential, means forming a decade transformer connected across said source of A.C. potential as a precision potential divider network to derive a primary scan reference output signal having an amplitude variable in a multitude of discrete incremental values according to the setting of said decade transformer and having a precisely predetermined linearity, means forming a Hall effect transducer disposed in a magnetic field to be scanned to derive a signal having an amplitude serving as a measure of the magnetic field intensity, means forming an error detector for comparing the amplitude of the primary scan reference signal with the amplitude of the signal derived from the hall effect transducer to obtain an error signal corresponding to the difference in amplitude of the two signals, and means responsive to the error signal for causing the intensity of the magnetic field to track the amplitude of the primary scan reference signal to produce a null balance condition in the output of said error detector, whereby the magnetic field intensity is caused to be scanned in accordance with settings of said decade transformer.

2. The apparatus of claim 1 including, means forming a second source of A.C. potential, means forming a second voltage divider connected across said second source of potential to derive a secondary scanned reference potential having an amplitude which is continuously variable over a certain scan range, means for superimposing the secondary scanned reference potential on the primary scan reference potential as both are fed into said error detector to cause the magnetic field to be scanned inbetween discrete intensities as determined by the primary scan reference signal.

3. The apparatus of claim 2 wherein the scanned magnetic field is the ion focusing magnetic field of a mass spectrometer of the type wherein the charge-to-mass ratio of the focused and detected ions varies in a linear manner according to the second power of the magnetic focusing field intensity, and wherein the said Hall effect transducer comprises a tandem connection of two Hall effect crystals in the magnetic field to derive an output signal for comparison in said error detector that varies linearly according to the second power of the magnetic field, whereby the scanned output of the mass spectrometer is linear with respect to charge-to-mass ratio.

References Cited

UNITED STATES PATENTS

| | | | |
|---|---|---|---|
| 2,832,036 | 4/1958 | Cutler | 323—47 |
| 3,244,876 | 4/1966 | Kanda. | |
| 3,342,991 | 9/1967 | Kronenberger. | |

ARCHIE R. BORCHELT, *Primary Examiner.*

P. A. URIBE, *Assistant Examiner.*

U.S. Cl. X.R.

250—41.9